US009953371B2

(12) United States Patent
Czaja et al.

(10) Patent No.: US 9,953,371 B2
(45) Date of Patent: *Apr. 24, 2018

(54) SYSTEM AND METHOD FOR PROVIDING AND ACTIVATING COMMODITIZED INSURANCE (71) Applicant: Hartford Fire Insurance Company, Hartford, CT (US)

(72) Inventors: Ian J. Czaja, Simsbury, CT (US); Wayne K. Whiten, West Hartford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,595

(22) Filed: May 15, 2017

(65) Prior Publication Data

US 2017/0249703 A1 Aug. 31, 2017

Related U.S. Application Data

(63) Continuation of application No. 13/460,281, filed on Apr. 30, 2012, now Pat. No. 9,652,806.

(51) Int. Cl.
*G06Q 40/00* (2012.01)
*G06Q 40/08* (2012.01)
*G06Q 30/06* (2012.01)

(52) U.S. Cl.
CPC ........ *G06Q 40/08* (2013.01); *G06Q 30/0641* (2013.01); *G06Q 2220/12* (2013.01)

(58) Field of Classification Search
CPC .................. G06Q 40/00; G06Q 40/08
See application file for complete search history.

(56) References Cited

U.S. PATENT DOCUMENTS

| 8,046,246 | B1 | 10/2011 | Yager et al. | |
|---|---|---|---|---|
| 8,065,169 | B1 | 11/2011 | Oldham et al. | |
| 8,095,399 | B2 | 1/2012 | McConnell et al. | |
| 8,150,714 | B2* | 4/2012 | Prescott | G06Q 40/08 705/4 |
| 8,162,208 | B2 | 4/2012 | Eckert et al. | |
| 8,295,910 | B1* | 10/2012 | Weisenberger | A61B 6/12 600/407 |
| 8,602,297 | B2* | 12/2013 | Wilen | G06Q 20/28 235/375 |
| 8,620,818 | B2* | 12/2013 | Hughes | G06Q 30/06 705/51 |

(Continued)

*Primary Examiner* — Lalita M Hamilton
(74) *Attorney, Agent, or Firm* — Volpe and Koenig, P.C.

(57) ABSTRACT

A system and method for providing commoditized insurance products to at least one consumer is disclosed. The system includes a commoditized insurance product including an activation code and an insurance company that underwrites the commoditized insurance product and provides the commoditized insurance product to a retail outlet. Based on consumer purchase of the commoditized product at the retail outlet and initiation of an activation process, the insurance company receives an activation code associated with the commoditized insurance product and provides verification queries to the consumer, and based on positive responses to the queries activates the policy providing the selected insurance coverage for the consumer.

15 Claims, 7 Drawing Sheets

(56) References Cited

U.S. PATENT DOCUMENTS

| | | | |
|---|---|---|---|
| 8,925,823 B2* | 1/2015 | Chakiris | B42D 15/045 |
| | | | 235/380 |
| 8,939,354 B1* | 1/2015 | Hinson | G06F 21/86 |
| | | | 235/375 |
| 9,767,254 B2* | 9/2017 | Lorsch | G06F 19/323 |
| 2004/0139318 A1* | 7/2004 | Fiala | G06Q 20/3558 |
| | | | 713/165 |
| 2005/0108064 A1 | 5/2005 | Castleman et al. | |
| 2009/0182585 A1 | 7/2009 | Harkensee et al. | |
| 2009/0287511 A1 | 11/2009 | Carroll et al. | |
| 2011/0320224 A1 | 12/2011 | Sen et al. | |
| 2012/0041790 A1 | 2/2012 | Koziol | |
| 2013/0179194 A1* | 7/2013 | Lorsch | G06F 19/323 |
| | | | 705/3 |
| 2014/0074513 A1 | 3/2014 | Bhatt et al. | |

* cited by examiner

SYSTEM AND METHOD FOR PROVIDING AND ACTIVATING COMMODITIZED INSURANCE

CROSS REFERENCE TO RELATED APPLICATION

This application is a continuation of U.S. patent application Ser. No. 13/460,281, filed Apr. 30, 2012, which is incorporated by reference as if fully set forth.

BACKGROUND

Despite the availability of insurance for a wide variety of individual and business/organizational risks, there are areas where many potential consumers do not buy or do not maintain insurance despite the presence of insurable risks and available options. There are a myriad of reasons why these areas tend to be underserved including, for example, areas of small business insurance where lack of a legal or contractual mandate or the perceived cost and complexity of available options prevents awareness or interest in insurance offerings.

Additionally, there are many insurance products that suffer from the buy and cancel phenomenon. Using the example above related to small business owners, there are numerous small business owners who buy and cancel policies. These owners tend to have periods during which they are mandated to have insurance and therefore only participate when mandated despite certain insurable risks continuing outside of the mandated period.

The underserved markets tend to create cottage industries of other mechanisms to substitute for the insurance product that is avoided or not procured. These mechanisms include warranties, self-funding options including cash reserves and credit cards, specific selection of business structures, and/or personal insurance.

It is in the interest of insurance companies to target these segments and provide products that will fulfill these needs in a way that demonstrates a clear value for the price with simple activation or configuration.

SUMMARY

A system and method for providing at least one commoditized insurance product to at least one consumer is disclosed. The system for providing at least one commoditized insurance product to at least one consumer includes a memory device configured to store information in a central record that includes, at least one activation code associated with pre-defined parameters for an insurance policy and identified with a commoditized insurance product and a set of verification queries associated with each of the at least one activation code, the set of verification queries identifying the insurance underlying the commoditized insurance product including at least one state of coverage and type of entity being covered. The system further includes a processor configured to receive an activation code associated with the commoditized insurance product and access the memory device to determine the set of verification queries associated with the received activation code, and a communications interface to provide the determined set of verification queries to a purchaser of the commoditized insurance product and receive responses thereto that when processed using the processor activates the policy providing the selected insurance coverage for the purchaser.

A method of providing insurance using a commoditized insurance product identified by indicating information including insurance coverage and a pre-set cost, wherein a box is provided to an outlet for a myriad of potential insureds to peruse and wherein the outlet collects the pre-set cost from at least one potential insured in exchange for the insurance product is disclosed. The method includes storing, in a memory device, information that indicates the insurance coverage and type of insurance provided at a pre-set cost in the insurance product, receiving information via a communication interface from a computing system at the outlet regarding the collection of the pre-set cost and an associated payment code identifying the transaction involving the exchange of the insurance product, receiving transmitted activation and payment codes in an attempt to activate the insurance product from a computing device of the at least one potential insured, processing the received activation code and payment code by comparing the received activation code with the stored associated activation code and the received associated payment code using a processor, and outputting queries stored in the memory device, via the communication interface, to bind the policy based on a processor comparison of at least one received response to the queries.

A method of processing data related to a commoditized insurance product identified by indicating information including insurance coverage and a pre-set cost, wherein a box is provided at an outlet for a myriad of potential insureds to peruse, the box having associated therewith an activation code and is provided to at least one potential insured in exchange for the pre-set cost is also disclosed. The method includes providing an insurance product that has associated therewith an activation code for a pre-set cost associated with the coverage, at a computing system at the outlet, executing a transaction for the collection of the pre-set cost in exchange for the insurance product, and in response to the executed transaction, transmitting information via a communication interface regarding the collection of the pre-set cost and an associated payment code that identifies the transaction involving the exchange of the insurance product to an insurance company providing the insurance coverage. The insurance product may be activated using the activation code associated with the insurance product and the payment code, and wherein the policy is bound using queries based on a comparison of a received activation, the activation code associated with the insurance product and received information responsive to the queries.

The computer readable medium including hardware design code stored thereon which when executed by a processor cause the system to run an activation process including an activation code associated with an insurance policy and a payment code identifying the purchase of the policy for a pre-set price and based on positive responses to verification queries of the to be insured is disclosed. The method includes receiving information via a communication interface from an outlet regarding the collection of the pre-set cost and an associated payment code identifying the transaction involving the exchange of the insurance product, receiving transmitted activation and payment codes via the communication interface in an attempt to activate the insurance product, processing, at the processor, the received activation code and payment codes to identify the policy and associated queries, and outputting, by the processor and via the communication interface, queries stored in a memory device, to bind the policy based on a processor comparison of the received information responsive to the queries.

BRIEF DESCRIPTION OF THE DRAWINGS

A more detailed understanding may be had from the following description, given by way of example in conjunction with the accompanying drawings wherein.

DETAILED DESCRIPTION

Disclosed herein are processor-executable methods, computing systems, and related technologies and systems that may be used to provide commoditized insurance products to consumers. The commoditized insurance products may be classified according to the type of insurance offered, the level of protection, the states and locales where protection may operate and be activated. The commoditized insurance product may include within a given product selection a one size fits all type of insurance. As will be discussed further herein below, the commoditized insurance product is a one size fits all insurance, in that, the product is not tailored for the particular purchaser of the insurance. Further, the present commoditized insurance product may be provided to consumers in a retail environment that does not require the use of an agent to make the sale. Once the retail store collects fees, the commoditized insurance product may be activated to provide coverage to the consumer. This activation may occur by the use of an activation code that accompanies the commoditized insurance product along with a sales receipt received during the collection of fees associated with the commoditized insurance product at the retail store. During activation, a myriad of verifications are considered. Once these verifications are met, the commoditized insurance product is activated and insurance coverage is effective. Proof of insurance may be received and verified after the insurance product is activated.

The present system, method and product operate to enable entities that are underserved in the insurance industry to buy, as a commodity, off the shelf insurance coverage applicable to their needs, and activate these off the shelf insurance products to reap the benefit of insurance coverage while the insurance company provides products to new customers that were previously underserved and potentially enrolls a lifelong insurance client. While generally the present description makes reference to off the shelf products and retail outlets, this disclosure also includes utilizing online stores, infomercials, magazine advertisements, smartphone applications, and other distribution venues that would be understood as the system is described herein. An agent of the insurance company may be involved in the activation as required by law, or as provided by other benefits incurring in the transaction, such as ease of activation by a consumer, for example. This involvement may occur even though the agent is not involved in the payment collection.

Figure 1:
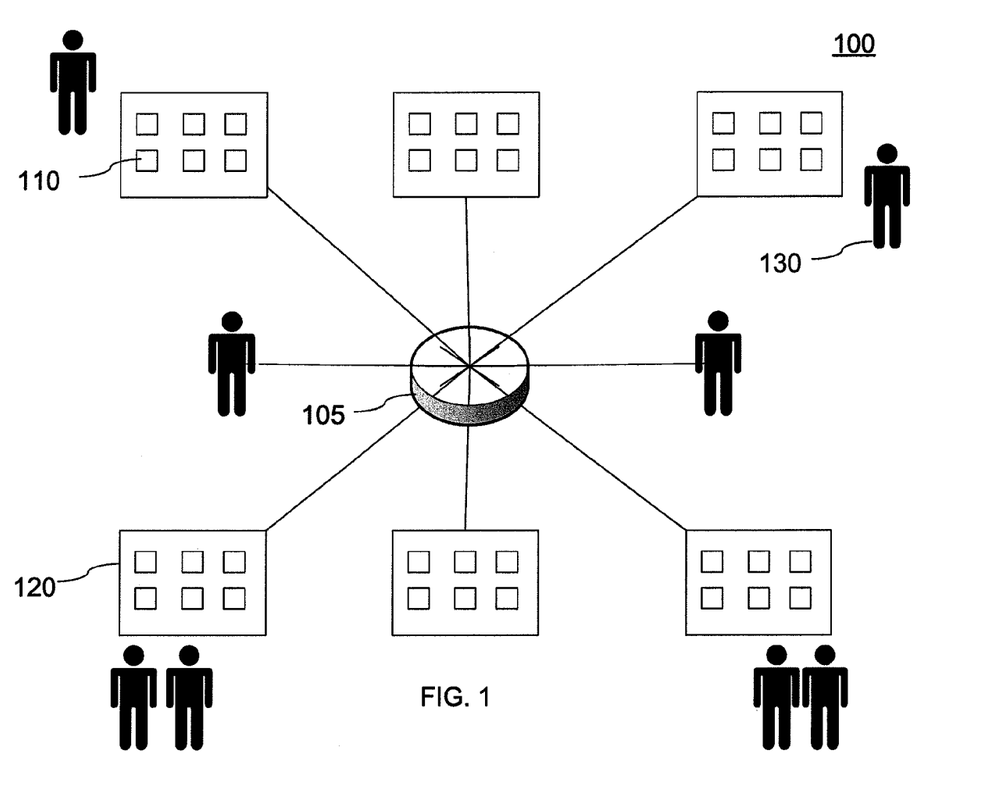
FIG. 1 illustrates an insurance distribution system for distributing commoditized insurance products to consumers.

FIG. 1 illustrates an insurance distribution system 100 for distributing commoditized insurance products to consumers. A commoditized insurance product is a product that provides preselected coverage for a set price. This system may distribute insurance products using product distribution techniques to enable an insurance product or service available for use or consumption by a consumer or business user. This system may utilize retail chains and other companies that receive consumer foot traffic in order to sell the insurance product. Additional venues that may be utilized may include online stores, infomercials, magazine advertisements, smartphone applications, and other distribution venues that would be understood as the system is described herein. FIG. 1 illustrates an insurance distribution 100 as described in the embodiments included herein. FIG. 1 shows an insurance provider 105 that provides an insurance product 110 that may be offered in a commoditized fashion. That is, insurance product 110 may be provided as a box item within a store 120, such as on shelves, for example. A user 130 may peruse insurance products 110 displayed on store 120 shelves. Based on the needs and desire of user 130, one of products 110 may be purchased.

Insurance distribution 100 may take a myriad of different forms and although the present description focuses on certain distributions as opposed to focusing on other distribution systems, these other distribution systems such as shelved products in an insurance company store, shelved products in other stores, and/or direct online sales of commoditized insurance products should be included in the present description.

Insurance provider 105 may include individuals and companies that are licensed or legally able to sell and/or distribute insurance information and products within a given geographic area, such as a state or locale, for example.

Insurance product 110 may include a streamlined activation product that is sold at a fixed price. The price of insurance product 110 may be based broadly on the coverage included by the product described on the package of product 110. For example, tiers of products may be utilized providing a myriad of different coverage levels, types of insurance coverage, and/or duration. Product 110 may provide a mechanism to allow for the tracking of policies and capturing consumer verification to protect insurance provider 105. Product 110 may be identified as configured solutions of essential coverage for key market groups. Product 110 may include a product that is sold in a retail outlet for a price point under $150, for example. The duration of the insurance may be varied to accommodate the price point.

Store 120 may include a retail outlet or other consumer accessible area where products may be purchased. Store 120 may include a store that is under the control of insurance provider 105. Store 120 may act as a collector of fees for insurance provider 105, such as a provisional collector of payment, for example. Store 120 may also include an online distribution of products that a consumer may peruse online using a computer or computing device.

Store 120 may receive and transmit information associated with the transaction including activation code, payment location, payment date and time, payment amount in the transaction, transaction history or other personal data associated with the individual through the relationship with store 120, and changes in inventory associated with the product 110.

User 130 may be any consumer of insurance products 110. User 130 may view products 110 within store 120 and select a commoditized insurance product 110 based on the needs of user 130.

Once purchased, the product 110 needs only to be activated to provide the desired insurance protection.

Figure 2:
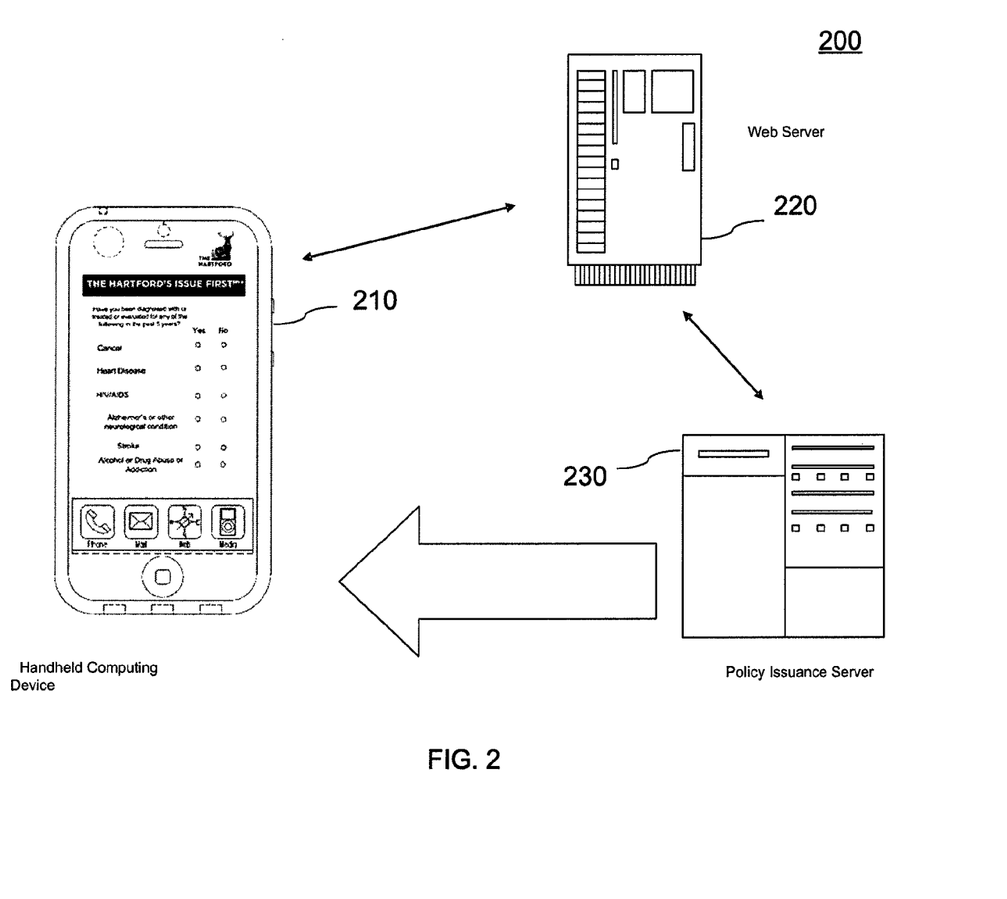
FIG. 2 illustrates an activation diagram for activating the insurance product purchased in the distribution system of FIG. 1.

FIG. 2 illustrates an activation diagram 200 for activating the insurance product purchased in the distribution system of FIG. 1. Once purchased, insurance product 110 may be activated to provide the purchaser with the desired insurance coverage. Activation 200 may include an activation device 210 communicatively coupled to a web server 220. Web server 220 may be communicatively coupled to a policy issuance server 230. Policy issuance server 230 may provide the issued policy to user 130 via any communication medium. This may include email, displaying on a computer screen, facsimile, SMS or other messaging.

Activation 200 includes issuance of a policy based on pre-defined coverage. This activation may be performed by a user 130 who has purchased a product 110 in a store. Activation 200 may take place using an activation device 210. Device 210 may interact with a web server 220. Device 210 may take the form of a computing device, telephone or any other interactive medium where a consumer may speak or interact with an agent or device operating on behalf of insurance provider 105.

Device 210 may send or receive information related to purchaser address, type of business including industry type, business structure, and age, personal and/or social data to support data fill and/or additional information available. Also device 210 may interact by providing or receiving payment indicators, payment/account information, activation code, insurance term, insurance policy details, account alerts and warnings, verifications, acceptance of terms and conditions, and other settings or preferences, as well as other business offers.

Web server 220 may be any conduit to enable the form of communication selected for activation 200. For example, web server 220 may take the form of an email server when the policy is activated using an email access, and similarly may take the form of a fax server when the policy is activated using fax communication.

Policy issuance server 230 may compile information related to the specific commoditized insurance product. Based on the activation code from the commoditized insurance product that is provided during activation, policy server 230 may load the specifics of the product policy and associate the verifications needed for activation of the policy. Based on the activation code, policy server 230 may identify that the product at issue is small business insurance that has a term of 90 days and liability limits of $300,000 with a $500 deductible. Based on this policy, the verification queries may be determined. For example, the queries may include the state of residence of the business and the number of employees employed by the business. Once the purchaser responds to the verification, based on the responses the policy may issue and be in force.

Once completed, the purchaser may receive a text or email message, or other communication providing the policy number of the new policy. This communication may further include a transmission of the policy, such as by providing a PDF of the policy, for example. The declarations page of the policy may be provided for the purchaser to review.

By way of non-limiting example only, activation 200 may take place by a user activating their personal computing device and directing the device to point to an address of the insurance provider and then after identifying the purchased product, receiving the issued insurance policy by email.

Referring now to both FIGS. 1 and 2, user 130 may acquire insurance product 110 from store 120. Product 110 may include an activation code. The retail receipt may include a payment code. The activation code and the payment code may together be required to verify and activate product 110. User 130 who purchases product 110 may register and verify the underlying attributes needed for the insurance. This verification may be performed using a phone, web-based computer, or other device for corresponding and providing information from one place to another. Product 110 may be designed such that the coverage is limited to enable product 110 to bind, unless one of the underlying attributes is not met.

Verification may include verifying the location of the entity for which the insurance coverage is applicable, that the type of coverage is appropriate for the entity, verify that certain opt out provisions are not applicable, and screen any ineligibility questions. For example, verification may include determining the state in which coverage is desired. A comparison may be performed to ensure that the selected and purchased product is applicable for the desired state. In the case of small business insurance, verification may occur that determines that the small business is operating in Connecticut and the selected product is designed for coverage in Connecticut. This verification may be necessary as insurance coverage often varies from state to state and the regulations governing the insurance coverage vary state to state.

Some or all of verification, or the information underlying the verification, may be imported and/or pre-filled from other websites or information contained on activation device 210, for example. That is, similarly to other web services, information may be imported similar to, and even from, applications such as Facebook and/or FourSquare.

Further, a loyalty program may be created, or an existing loyalty program utilized, that enables information to be transferred. For example, a user may be enrolled in a loyalty program with the retailer 120 and third party data may be incorporated into the verification based on information that is included within the loyalty program.

Further, the verification may determine if the entity seeking coverage matches the entity for which the product covers. For example, in the case of small business insurance, the verification may include determining that the to be covered entity is a small business. This may be achieved by requiring input of information that enables the web server/policy issuance server to determine that the entities match.

Certain eligibility issues may be addressed in the verification process. These may include that the entity is a United States citizen and/or that the company is configured under the laws of a certain state. Further eligibility issues may include that the dwelling has a value less than a certain amount, or within certain ranges of value. In the case of a small business, verification may include eligibility questions that determine that the company employs less than a certain number of employees, such as from 1-5, for example. Verification may also determine eligibility based on the income of the business. The type of business may be considered for eligibility purposes, such as whether the business is seasonal, including business such as Christmas tree stands, and calendar stores, for example.

For example, in the case where user 130 is purchasing small business insurance as product 110, user 130 may activate the insurance by verifying that the state of operation of the business matches that of the product 110. Further, the attributes may include liability not including increased liability limits, umbrella, products/completed operations, Employment Practices Liability Insurance (EPLI), optional coverages such as protection for data breach, for example. Further, the attributes may include property information such as verification that the property does not include equipment breakdown, business income, crime, stretch increased limits and/or optional coverages. The policy for the small business owner may include a 90 day term pro-rated from the minimum premium with liability limits of $300,000, Business Personal Property (or Contents Insurance) (BPP) of $10,000, a $500 deductible and no building. Once the attributes are verified the insurance binds and a policy is issued.

Payment may be transmitted from store 120 to insurance provider 105 to demonstrate that store 120 provided only a clerical collection in order to satisfy the myriad of local, state and federal rules associated with offering and selling insurance. Alternatively, if the insurance company or an agent thereof is acting in the capacity of store 120, or if according to the appropriate laws, store 120 may act on behalf of the insurance company to sell insurance, this payment may include an insurance premium or other payment that may be transferred generally from an agent to the insurance company.

Once the policy is issued, claims may be handled in the same fashion as any other policy of insurance provider 105. Renewals may be offered as a policy with the same terms, or with an opportunity for a "check-up" to offer additional features and benefits.

Figure 3:
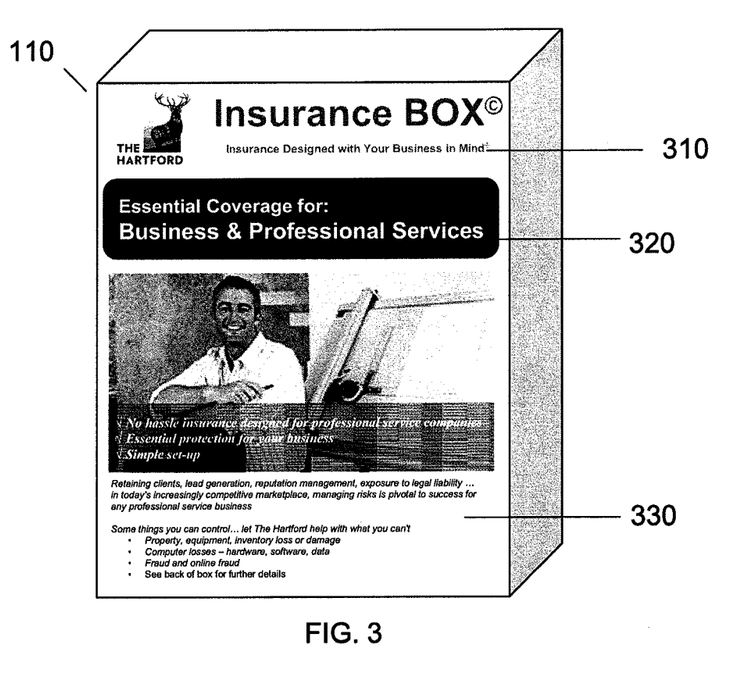
FIG. 3 illustrates a commoditized product according to a present embodiment.

FIG. 3 illustrates a commoditized product 110. Commoditized product 110 may include packaging with a CD or other storing mechanism for software include therein. Alternatively, the box may include an activation code for identifying and activating product 110 as described. On the outside of the packaging there may be a title 310 of the insurance product included therein. As shown the commoditized product 110 is titled 310 to identify the product. A description of the insurance type 320 may be included. As illustrated, insurance type 320 includes essential coverage for business and professional services. As would be evident to those possessing an ordinary skill in the pertinent arts, any available insurance coverage may be provided. For example, the insurance product may provide coverage for building and business personal property, computers and media, bodily injury and property damage liability, and personal and advertising injuries. The coverage may provide a cap for coverage, such as up to $10,000, for example. Further, the packaging may include a more detailed description of the coverage essentials 330. In the present example, the coverage essentials 330 include property, equipment, and inventory loss and damage; computer losses—hardware, software, and data; fraud and online fraud; and instructions on where further coverage details may be found. In this case the packaging directs a consumer to the back of the box for further details.

The back of the box may include further details including the specific insurance coverage that is included in the product. The box may also contain a comparison of other commoditized insurance products for comparison and ease to the consumer in selecting the desired and needed insurance coverage.

For example, the insurance product may identify on the back of the box the industry for which the coverage is applied. The product may identify the states of coverage, such as applicable to businesses domiciled in the states, for example. The product may provide other aspects of the business to be covered such that a customer may properly identify the product to be applied. These aspects may include the number of employees, such as there are no other employees besides the owner; the amount of office space, such as that the business does not own or rent a physical location; limits on total yearly sales, such as total annual sales under a certain limit; and limitations on other current or prior insurance claims, such as identifying that there are no current or prior insurance claims exceeding a certain value. The package may include disclaimer language. This disclaimer language may evidence that general terms of coverage are provided and further suitability may be determined upon activation.

The product may include requirements defined and listed using ISO language and including the most common requirements and coverage. The product may be described in concise terms and no negotiation or tradeoffs occur in coverage against price.

Figure 4:
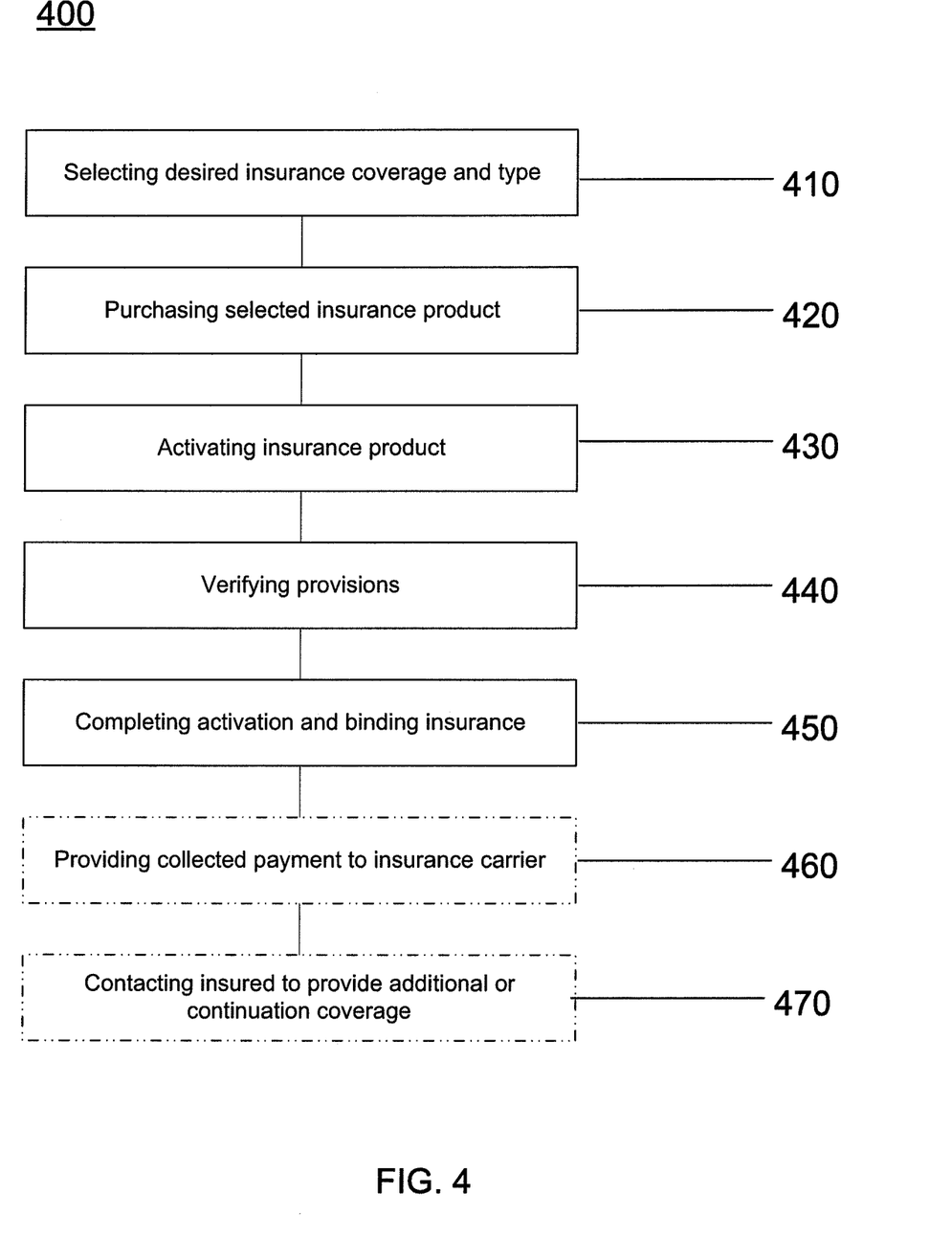
FIG. 4 illustrates a method of acquiring insurance according to an embodiment described herein.

FIG. 4 illustrates a method 400 of acquiring insurance according to an embodiment described herein. Method 400 includes selecting a commoditized insurance product from a retailer at step 410. This selection may be based on a desired insurance coverage that the selector wishes to supplement and/or procure. This product may include an activation code that may be used to enable the insurance in subsequent steps.

After the commoditized insurance product is selected, the selected product may be purchased from the retail store at step 420. This purchase includes acquiring a sales receipt that includes a code that may be used in activation of the insurance.

Once purchased, the consumer may activate, at step 430, the commoditized insurance product using the activation code packaged with the product and the sales receipt information included during purchase.

Step 440 may include verification of certain opt in and opt out provisions as described herein above. Once these verifications are achieved the commoditized insurance product is activated at step 450 and coverage under the insurance plan is effective.

Method 400 may additionally include the retail store providing a payment, at step 460, to the insurance carrier that is based on the payment received for selling the commoditized insurance product. This payment may be held by the retailer for the insurance carrier and paid at certain predetermined intervals for example.

Method 400 may include the insurance carrier contacting the insured at step 470 to provide additional insurance coverage and/or continuation of the procured commoditized insurance coverage at the expiration of the policy, for example. This contact may include a continuation of current coverage or the insurance provider may perform a detailed analysis of the insured's needs and tailor individualized insurance coverage for the insured.

Figure 5:
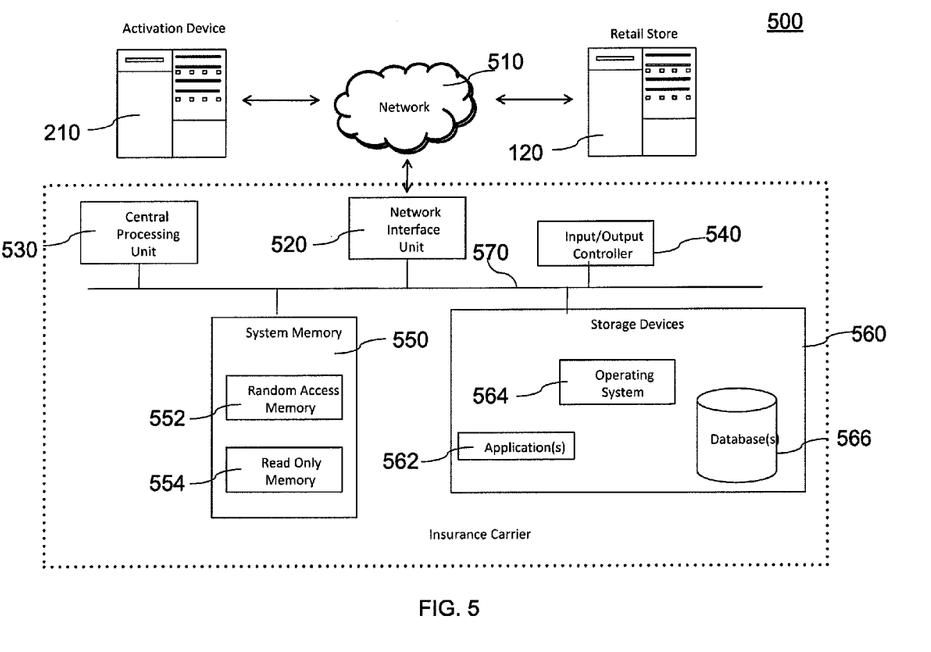
FIG. 5 illustrates a system diagram of the insurance carrier system used for activating the commoditized insurance product.

FIG. 5 illustrates a system diagram of the insurance carrier system 500 used for activating the commoditized insurance product according to an embodiment. As shown in FIG. 5, an activation device 210 interacts with the insurance carrier using the internet 510. Any data provided via the activation device 210 passes through the internet 510 to the insurance carrier. Retail store 120 may pass data to the insurance carrier via the internet 510. The insurance carrier may be configured to communicate with both the activation device 210 and the retail store 120 via internet 510. The insurance carrier system 500 may include a network interface 520 to enable the communication with either or both of activation device 210 and retail store 120.

System 500 includes one or more central processing units (CPU) 530, a network interface unit 520, an input/output controller 540, system memory 550, and one or more storage devices 560. Each CPU 530, network interface unit 520, input/output controller 540, system memory 550, and storage devices 560 are communicatively coupled via bus 570. System memory 550 may include random access memory (RAM) 552, read only memory (ROM) 554, and one or more caches. Storage devices 560 may include one or more applications 562, an operating system 564, and one or more databases 566. Storage devices 560 may take the form of, but are not limited to, a diskette, hard drive, CD-ROM, thumb drive, hard file, or a Redundant Array of Independent Disks (RAID). System 500 may be accessed via network 510 using a mainframe, thin client, personal computer, mobile device, pad computer, or the like and information processed by CPU 530 and/or operated upon or stored on storage devices 560 and/or in memory 550 may be displayed to a user through a user device (not shown).

Operationally, system 500 monitors for activation communications. Upon receipt of an activation communication, CPU 530 interprets and processes the communication to activate the commoditized insurance product. During processing memory 550 and storage devices 560 may be utilized as needed by processor 530.

The insurance carrier may query the activation device to verify parameters of the coverage. As discussed herein throughout this may include providing certain queries to the consumer and based on the results of the queries making a binary determination of whether the selected policy to be activated is appropriate. In the event that the coverage is appropriate, the policy is activated. In the event that the policy is not appropriate given the responses, the insurance carrier may provide alternative remedies including returning to the retail stores and selecting an alternative product and/or providing a quote for applicable coverage on a customized basis.

Specifically, a policy is created either by interfacing with system 500. This policy may be stored in storage devices 560 which may take the form of a database or data in a database, such as database 566. This policy may include identifying information about the policy holder, such as the name of the entity and the provisions of the insurance including a location or locale that will be covered by policy, and the date and status of the policy. In addition, one or more tasks may be created to provide a roadmap for or identify future processing of the policy by system 500.

System 500 may provide methods for activating and renewing insurance policies. This may include monitoring polices and state requirements and comparing these policies to underlying insurance data. This monitoring may be performed using the record of system 500 and may be performed by interfacing with system 5100.

In this way system 500 operates to provide a system and method that enables entities that are underserved in the insurance industry to buy off the shelf insurance coverage applicable to their needs, and activate these insurance products to gain efficiencies and identify impacts of insurance coverage while the insurance company provides products to new customers that were previously underserved and potentially enrolls a lifelong insurance client.

Figure 6:
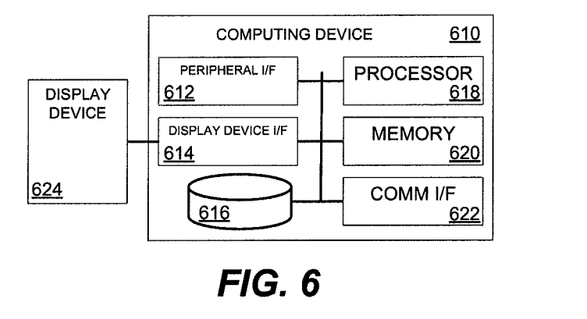
FIG. 6 shows an example computing device that may be used to implement features described herein with reference to FIGS. 1-5.

FIG. 6 shows an example computing device 610 that may be used to implement features described above with reference to FIGS. 1-5. The computing device 610 includes a processor 618, memory device 620, communication interface 622, peripheral device interface 612, display device interface 614, and data storage device 616. FIG. 6 also shows a display device 624, which may be coupled to or included within the computing device 610.

The memory device 620 may be or include a device such as a Dynamic Random Access Memory (D-RAM), Static RAM (S-RAM), or other RAM or a flash memory. The data storage device 616 may be or include a hard disk, a magneto-optical medium, an optical medium such as a CD-ROM, a digital versatile disk (DVDs), or Blu-Ray disc (BD), or other type of device for electronic data storage.

The communication interface 622 may be, for example, a communications port, a wired transceiver, a wireless transceiver, and/or a network card. The communication interface 622 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 612 is configured to communicate with one or more peripheral devices. The peripheral device interface 612 operates using a technology such as Universal Serial Bus (USB), PS/2, Bluetooth, infrared, serial port, parallel port, and/or other appropriate technology. The peripheral device interface 612 may, for example, receive input data from an input device such as a keyboard, a mouse, a trackball, a touch screen, a touch pad, a stylus pad, voice activation, retina/biometric identification system and/or other device. Alternatively or additionally, the peripheral device interface 612 may communicate output data to a printer that is attached to the computing device 610 via the peripheral device interface 612.

The display device interface 614 may be an interface configured to communicate data to display device 624. The display device 624 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 614 may operate using technology such as Video Graphics Array (VGA), Super VGA (S-VGA), Digital Visual Interface (DVI), High-Definition Multimedia Interface (HDMI), or other appropriate technology. The display device interface 614 may communicate display data from the processor 618 to the display device 624 for display by the display device 624. As shown in FIG. 6, the display device 624 may be external to the computing device 610, and coupled to the computing device 610 via the display device interface 614. Alternatively, the display device 624 may be included in the computing device 600.

An instance of the computing device 610 of FIG. 6 may be configured to perform any feature or any combination of features described above as performed. Alternatively or additionally, the memory device 620 and/or the data storage device 616 may store instructions which, when executed by the processor 618, cause the processor 618 to perform any feature or any combination of features described above as performed. Alternatively or additionally, each or any of the features described above as performed may be performed by the processor 618 in conjunction with the memory device 620, communication interface 622, peripheral device interface 612, display device interface 614, and/or storage device 616.

Figure 7:
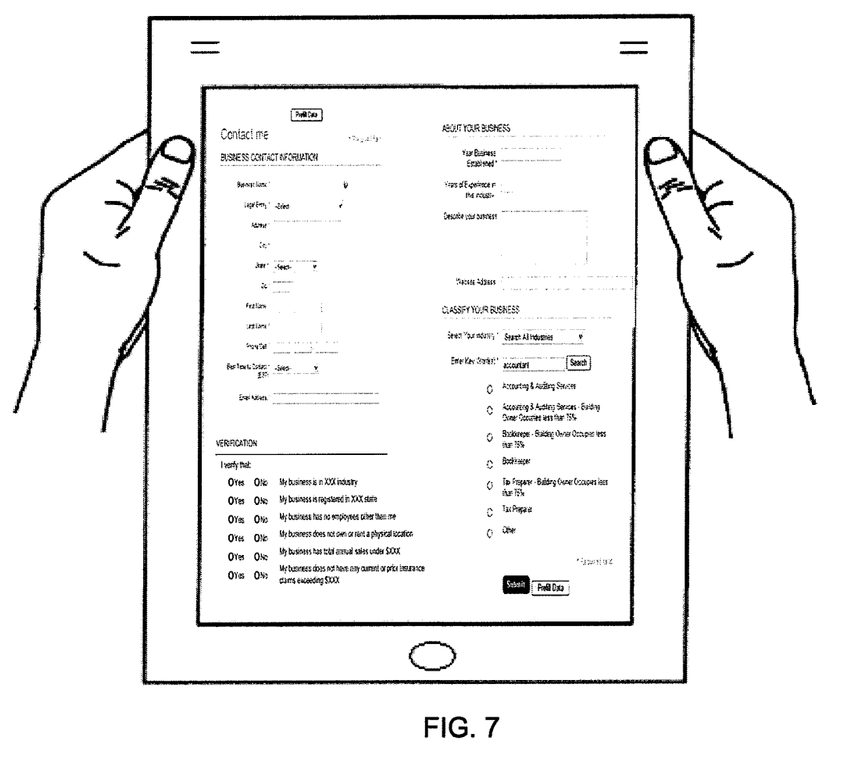
FIG. 7 shows a tablet computer that is a more specific example of the computing device of FIG. 6.

FIG. 7 shows a tablet computer 710 that is a more specific example of the computing device 610 of FIG. 6. The tablet computer 710 may include a processor (not depicted), memory device (not depicted), communication interface (not depicted), peripheral device interface (not depicted), display device interface (not depicted), storage device (not depicted), and touch screen display 724, which may possess characteristics of the processor 618, memory device 620, communication interface 622, peripheral device interface 612, display device interface 614, storage device 616, and display device 624, respectively, as described above with reference to FIG. 6. The touch screen display 724 may receive user input using technology such as, for example, resistive sensing technology, capacitive sensing technology, optical sensing technology, or any other appropriate touch-sensing technology.

Although examples are provided above that relate to small business insurance, the features described above with reference to FIGS. 1-7 may also be used, mutatis mutandis, in the context of travel insurance, renters insurance, automobile and equipment insurance, group medical insurance, non-profit organization insurance, government organization insurance and/or any other appropriate type of insurance. Further, although examples are provided above wherein a commoditized insurance product is provided to a consumer for subsequent application, the features described above with reference to FIGS. 1-7 may also be used, mutatis mutandis, to provide insurance that activates on sale.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features are described above with reference to the example insurance distribution system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-7 may be used alone without the other features and elements or in various combinations with or without other features and elements. Sub-elements of the methods and features described above with reference to FIGS. 1-7 may be performed in any arbitrary order (including concurrently), in any combination or sub-combination.

What is claimed is:

1. A system for activating a product, the system comprising:
   a product having an activation code associated therewith, the product being available for purchase for a price, the activation code identifying pre-defined parameters for the product; and
   a carrier that provides the product, the carrier receiving payment in an amount of the price and information regarding the activation code, via a web server upon purchase of the product;
   the carrier via an issuance server including:
      a memory device configured to store information in a central record that includes:
         the activation code associated with pre-defined parameters for the product and identified with the product; and
         a set of verification queries associated with the activation code, the set of verification queries related to the pre-defined parameters wherein the set of verification queries screen for eligibility of the product;
      a processor configured to receive the activation code associated with the product when a user device is used to attempt to activate the product via the carrier and access the memory device to determine the set of verification queries associated with the received activation code; and
      a communications interface to provide the determined set of verification queries to the user device and receive responses thereto, and on a condition that the processor determines that the received responses to the determined set of verification queries are in accordance with the product activates the product.

2. The system of claim 1 wherein the product is activated by the processor using the received activation code and a received payment code received from a customer via the communications interface over the internet wherein the payment code is indicative of a purchase of the product.

3. The system of claim 1 wherein the product identifies pre-defined insurance coverage that is purchased for a set price.

4. The system of claim 1 wherein, based on the responses to the verification queries, the processor determines the applicability of the product.

5. The system of claim 1 wherein a retail outlet provides a consumer a payment code commensurate with the purchase of the product and identifies this code to the processor via a network and the communication interface.

6. The system of claim 5 wherein the payment code is associated with the purchased product.

7. The system of claim 1 wherein the product includes software that when initiated on a computing device begins the activation of the product via a network connection.

8. The system of claim 1 wherein the product includes small business insurance.

9. The system of claim 1 wherein the product identifies a type of insurance.

10. The system of claim 1 wherein the product identifies the parameters of an insurance coverage for a customer to weigh in deciding to purchase the product.

11. A device for activating a product having an activation code associated therewith, the product being available for purchase for a price, the activation code identifying pre-defined parameters for the product, the device comprising:
    a carrier that provides the product, the carrier receiving payment in an amount of the price and information regarding the activation code, via a web server upon purchase of the product;

the carrier via an issuance server including:
   a memory device configured to store information in a central record that includes:
      the activation code associated with pre-defined parameters for the product and identified with the product; and
      a set of verification queries associated with the activation code, the set of verification queries related to the pre-defined parameters wherein the set of verification queries screen for eligibility of the product;
   a processor configured to receive the activation code associated with the product when a user device is used to attempt to activate the product via the carrier and access the memory device to determine the set of verification queries associated with the received activation code; and
   a communications interface to provide the determined set of verification queries to the user device and receive responses thereto, and on a condition that the processor determines that the received responses to the determined set of verification queries are in accordance with the product activates the product.

12. The device of claim 11 wherein the product is activated by the processor using the received activation code and a received payment code received from a customer via the communications interface over the internet wherein the payment code is indicative of a purchase of the product.

13. The device of claim 11 wherein, based on the responses to the verification queries, the processor determines the applicability of the product.

14. The device of claim 11 wherein a retail outlet provides a consumer a payment code commensurate with the purchase of the product and identifies this code to the processor via a network and the communication interface.

15. The device of claim 11 wherein the product includes software that when initiated on a computing device begins the activation of the product via a network connection.

* * * * *